US010493714B2

(12) United States Patent
Schwelling

(10) Patent No.: US 10,493,714 B2
(45) Date of Patent: Dec. 3, 2019

(54) LIFTING/ TIPPING DEVICE FOR EMPTYING A COLLECTION CONTAINER IN A BALING PRESS, AS WELL AS BALING PRESS AND METHOD FOR FILLING THE BALING PRESS

(71) Applicant: Hermann Schwelling, Salem (DE)

(72) Inventor: Hermann Schwelling, Salem (DE)

( * ) Notice: Subject to any disclaimer, the term of this patent is extended or adjusted under 35 U.S.C. 154(b) by 1049 days.

(21) Appl. No.: 14/945,889

(22) Filed: Nov. 19, 2015

(65) Prior Publication Data
US 2016/0144586 A1  May 26, 2016

(30) Foreign Application Priority Data

Nov. 19, 2014  (DE) .......................... 10 2014 116 955

(51) Int. Cl.
| | | |
|---|---|---|
| *B30B 9/30* | (2006.01) | |
| *B65G 65/23* | (2006.01) | |
| *B65F 1/14* | (2006.01) | |

(52) U.S. Cl.
CPC ............ *B30B 9/301* (2013.01); *B65F 1/1452* (2013.01); *B65G 65/23* (2013.01)

(58) Field of Classification Search
CPC ...... B30B 9/301; B65F 1/1452; B65F 1/1457; B65F 3/04; B65F 3/041; B65F 3/043; B65F 3/045; B65F 3/046; B65F 3/048; B65G 3/14; B65G 65/23
USPC .................................. 100/215; 414/419, 810
See application file for complete search history.

(56) References Cited

U.S. PATENT DOCUMENTS

| | | | |
|---|---|---|---|
| 4,941,796 A * | 7/1990 | De Filippi | ................ B65F 3/04 414/409 |
| 5,501,567 A * | 3/1996 | Lanzdorf | ................ B60G 3/20 280/86.5 |
| 5,772,385 A * | 6/1998 | Huntoon | ................ B65F 3/043 414/408 |

(Continued)

FOREIGN PATENT DOCUMENTS

| | | |
|---|---|---|
| EP | 2 537 668 A2 | 12/2012 |
| GB | 2 169 550 A | 7/1986 |

OTHER PUBLICATIONS

DIXI 60 SLS, Hydraulic Horizontal Baler, (www.ballenpressen.eu/ballenpressen/horizontal-ballenpressen/ballenpressen-slk.html), Press-systems for the volume reduction of recycling material, Issue Apr. 2012, total of 4 pages.

*Primary Examiner* — Jimmy T Nguyen
(74) *Attorney, Agent, or Firm* — Collard & Roe, P.C.

(57) ABSTRACT

A lifting/tipping device for emptying a collection container into a filling shaft of a baling press has a horizontal construction, for compaction of loose material, particularly of cardboard or similar waste/packaging material, into bales. The collection container can be pivoted from a starting position into an emptying position via a special lifting/tipping device, so that then, the waste material falls out of the collection container and through the filling shaft into an ante-chamber of a pressing chamber, in front of a pressing organ of the baling press, under the force of gravity. Thereby this ante-chamber is filled for the pressing process. The collection container is positioned on the baling press in such a manner that the functional surface required in the baling press is utilized in multivalent manner, thereby reducing the total functional surface.

16 Claims, 8 Drawing Sheets

(56) References Cited

U.S. PATENT DOCUMENTS

| | | | | |
|---|---|---|---|---|
| 5,984,609 A | * | 11/1999 | Bartlett | B65F 3/06 |
| | | | | 414/408 |
| 6,474,928 B1 | * | 11/2002 | Christenson | B65F 3/001 |
| | | | | 414/408 |
| 7,690,297 B1 | * | 4/2010 | Sagen | B30B 9/3003 |
| | | | | 100/19 R |

* cited by examiner

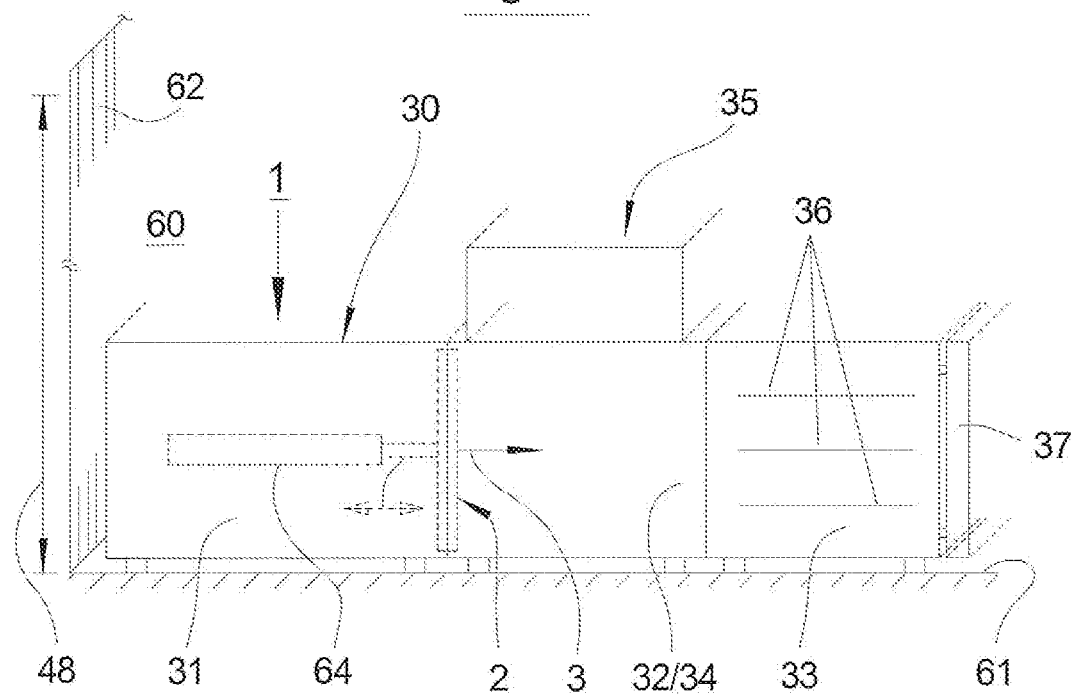
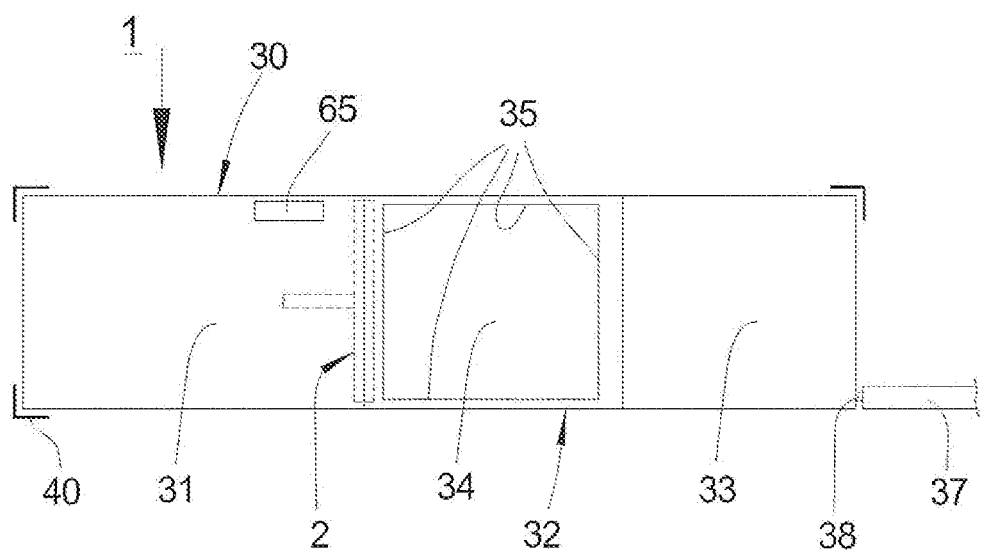

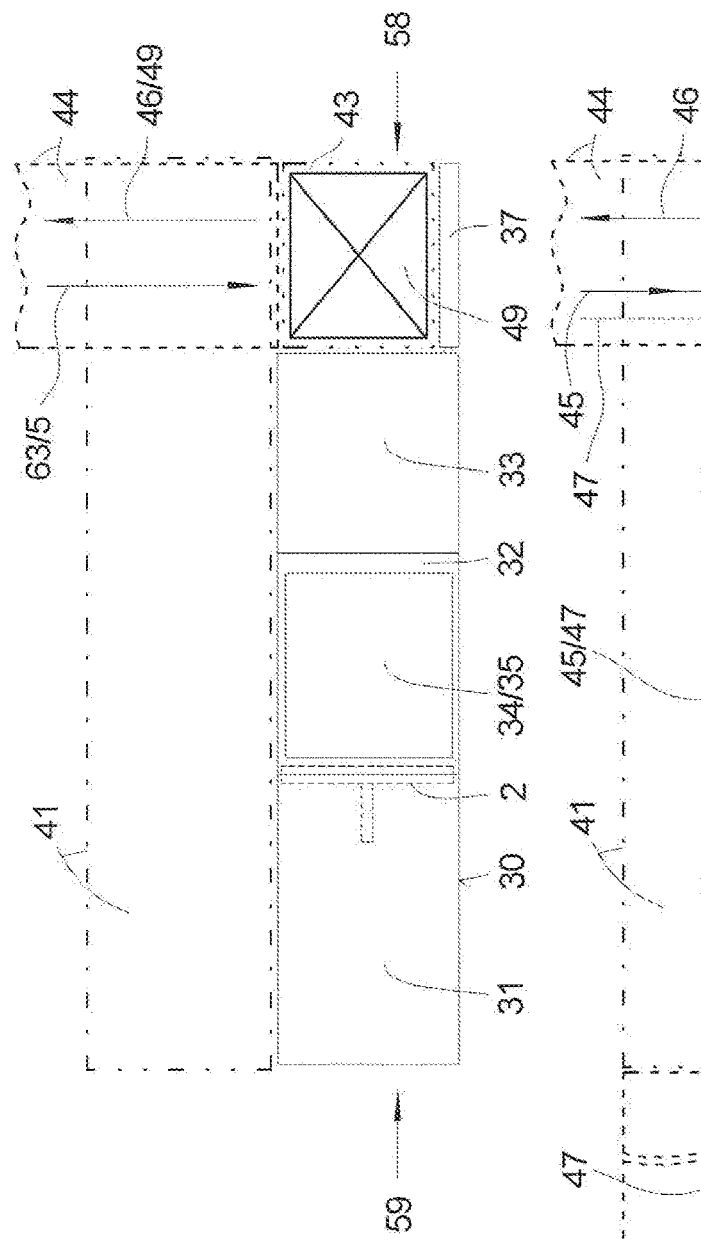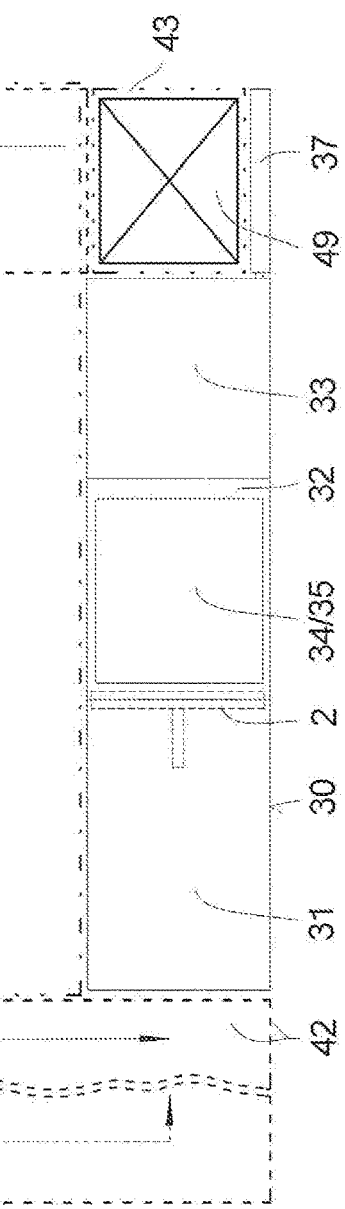

LIFTING/ TIPPING DEVICE FOR EMPTYING A COLLECTION CONTAINER IN A BALING PRESS, AS WELL AS BALING PRESS AND METHOD FOR FILLING THE BALING PRESS

CROSS REFERENCE TO RELATED APPLICATIONS

Applicant claims priority under 35 U.S.C. § 119 of German Application No. 10 2014 116 955.7 filed on Nov. 19, 2014, the disclosure of which is incorporated by reference.

BACKGROUND OF THE INVENTION

1. Field of the Invention

The invention relates to a lifting/tipping device for emptying a collection container into a filling shaft of a baling press, which is used for compaction of loose material, particularly of cardboard or similar waste/packaging material, into bales; wherein the collection container can be pivoted, by means of the lifting/tipping device, from a starting position into an emptying position, so that the loose material then drops out of the collection container, under the force of gravity, and through the filling shaft into an ante-chamber of a pressing chamber, in front of a pressing organ of the baling press, and thereby this ante-chamber is filled for the pressing process.

2. The Prior Art

Various devices on baling presses, for filling them with material to be compacted, by way of a filling shaft, are known from the state of the art. In a first variant, the baling press, which has a pressing body that can be moved horizontally, is filled from the side by way of a filling shaft in the form of a chute, such as, for example, in a baling press of the type DIXI 60 SLS (www.ballenpressen.eu/ballenpressen/horizontal-ballenpressen/ballenpressen-slk.html).

In a second variant of horizontal baling presses, the baling press according to GB 2 169 550 A, which can also be filled from the side, is filled by means of a lifting/tipping device. A collection container that can be temporarily coupled on is first lifted, using the lifting/tipping device, proceeding from a starting position on a guide track, until it has reached at least the upper edge of the filling funnel, and afterward, it is then pivoted toward the filling funnel, so that the waste material present in the collection container, moved by the force of gravity, can fall into the filling funnel.

In the case of the horizontal baling press type DIXI 60 SLS already mentioned above, the lifting/tipping device known from GB 2 169 550 A is also provided in one equipment variant. A lattice box filled with waste material is first brought into a sufficiently high position, and afterward pivoted toward the filling shaft to empty it.

A further variant of a horizontally working baling press is known from EP 2 537 668 A2. In this baling press, a filled collection container is lifted upward by means of a lifting/tipping device, proceeding from what is called the rear of the baling press, and, at the same time, it is continuously inclined, in other words tipped, so that when the filling shaft is reached, the content of the collection container falls into the filling shaft, moved by the force of gravity. In order to further increase the degree of automation for charging the baling press, and, at the same time, to lower the operating effort as well as the surface area requirement, there the lifting/tipping device for moving the collection container, filled with loose material, from the coupling position, the starting position, into the emptying position, by means of pivoting about a pivot axis that runs both perpendicular to the direction of the force of gravity and perpendicular to the advancing direction, is configured in such a manner that for coupling and uncoupling of the container, a holding unit provided with an insertion holder is present, wherein coupling takes place by means of laterally pushing the container into the holding unit, and uncoupling takes place by means of pushing the container out of the holding unit.

SUMMARY OF THE INVENTION

In spite of various advantages of rear charging in comparison with charging from a side region of the baling press, there is a demand on the market for a further increase in the degree of automation for charging a baling press that has a pressing body that can be moved horizontally, as well as also requirements to the effect of further optimizing, particularly reducing not only the required surface area requirement for setup and for operation of a baling press, but also the surface area requirement and the space requirement, particularly the functional height, for temporary positioning of the collection container filled with loose material, on the baling press, and for the lifting and tipping movement for emptying it into the filling shaft of the baling press.

The task of the present invention therefore consists in further developing a baling press having a horizontal construction, particularly a lifting/tipping device that can be used for a baling press, in such a manner that the required functional surfaces and/or the required pivoting space for handling of a collection container on the baling press, for filling it with waste material, can be optimized, particularly reduced. A secondary task is reducing the time span for emptying of the collection container into the filling shaft of the baling press and its return to its starting position.

The task is accomplished via a lifting/tipping device for emptying a collection container into a baling press, for compaction of waste material, such as cardboard and similar packaging material, having the characteristics described herein, and via a baling press for compaction of waste material, such as cardboard and similar packaging material, having the characteristics described herein, as well as via a method for filling a baling press having a pressing body that can be moved horizontally, having the characteristics described herein. Further embodiments and further developments of the invention are also described.

The advantages of the invention as compared with known solutions consist, in particular, in that the demand for functional surfaces next to the baling press, for its operation, is lower, and that furthermore, less time is needed for filling the baling press with waste material, which also has positive effects on energy consumption.

A further advantage consists in that the space requirement, particularly the spatial height required for moving the collection container from a starting position into an emptying position, is reduced by means of the new type of configuration of the lifting/tipping device.

The new lifting/tipping device for emptying a collection container into a baling press for compaction of waste material, preferably loose waste material such as cardboard and similar packaging material, is primarily conceived for use on what are called horizontal baling presses, particularly for baling presses having a horizontally movable pressing body, preferably for horizontal baling presses having a door disposed on the side of the bale ejection, which door simultaneously forms the counter-plate for the pressing process, during the pressing process.

According to one aspect of the invention, a lifting/tipping device was created, which can advantageously be used on a baling press of the said construction; it is preferably connected with the baling press. These baling presses have a horizontally movable pressing body, which can be temporarily pushed into the pressing chamber, for compaction of the waste material to form bales. Filling of the baling presses with waste material takes place by way of a filling shaft, which is open toward the top and opens downward into a collection chamber. Using the new lifting/tipping device, a collection container filled with waste material is moved from its starting position, in which coupling of the collection container with the lifting/tipping device takes place, into an end position for emptying the loose waste material as the result of the force of gravity, into the opening of the filling shaft. The waste material falls through this filling shaft into the collection chamber connected with the pressing chamber, and ends up in front of the pressing body.

The lifting/tipping device has a holding device in the form of a holder at its one end, for coupling the collection container. At its other end, the lifting/tipping device is connected with a drive, preferably with a hydraulic cylinder. Furthermore, the lifting/tipping device possesses means for transforming the force made available by the drive, in order to superimpose a further pivoting movement for the collection container onto a first movement—the basic movement. The first movement is also called pivoting/lifting movement.

These means for superimposing the movements are disposed in such a manner, according to the invention, that the first movement takes place about a first joint, while the second movement, the further pivoting movement, takes place about a further joint. The first joint is also called the central joint.

If one were to draw an arc with reference to the lower rear edge and with reference to the rear upper edge of the collection container, about the first joint, then according to the invention, the rear lower and the rear upper edge of the collection container always move within the imaginary arcs during emptying of the container. This has the advantage that less construction height is required for emptying the collection container. This is particularly advantageous in the case of low ceiling heights.

To state it more precisely, the movement lines along which the outer body edges of the collection container or of the holder move during the movement from the starting position into the end position, for emptying the collection container and to return it to its starting position, and which ultimately determine the required spatial height for operation of the baling press with a lifting/tipping device, are smaller, in terms of amount, in each instance, than the related arc that results from the radius between the first joint, the central joint of the lifting/tipping device, and the respective body edge.

Preferably, these movement lines of the body edges are each a curved path in the new lifting/tipping device. Each curved path of the corner points has a plurality of different radii along its progression between its start and its end, with reference to the central joint. Essentially, the radii constantly change during the movement. These curved paths are therefore furthermore not arcs.

It is advantageous if the further joint for the second pivoting movement of the collection container is disposed on the lifting arm with which the pivoting/lifting movement is carried out, at a distance from the first joint, the central joint. This further joint has an active connection with the holder for the collection container. This second pivoting movement of the collection container is such that an upper edge of the collection container positioned and locked in the lifting/tipping device, which edge faces the lifting/tipping device or the baling press, inclines toward the lifting arm during the pivoting/lifting movement.

According to one embodiment variant, the means for transforming the force made available by the drive are disposed in such a manner that the speed of the lifting movement and the speed of the further pivoting movement are different from one another.

Furthermore, a slight reduction in the cycle time for emptying the collection container into the baling press is achieved if the means for transforming the force made available by the drive are disposed in such a manner that the lifting movement and/or the further pivoting movement is/are not uniform between the starting position and the end position of the moved collection container.

According to a further embodiment variant, the lifting arm is in two parts. An end segment of the lifting arm connected with the holder is a pivoting shank. This pivoting shank is articulated onto the lifting arm at a further joint. This further joint is disposed at a distance from the first joint, the central joint, on the other segment of the lifting arm, the front segment, in the vicinity of the end segment. This pivoting shank is also called the third lever, in the description. During the pivoting lifting movement of the lifting arm, this shank is adjusted in its position relative to the front segment of the lifting arm, so that the total length of the lifting arm is shortened. This is a further measure, according to the invention, with which the result is achieved that the movement lines of the outer body edges of the collection container lie within the said arcs. Furthermore, in this way the result is achieved that the radii of these movement lines in the shape of curved paths are significantly smaller, in terms of amount, than the said arcs.

By means of the measures according to the invention, this advantage of the short radii is particularly present when the collection container is moved into the region above the baling press.

According to one embodiment variant, the means for producing the said lifting movement and the further pivoting movement for moving the collection container from a starting position into an emptying position/end position are two four-joint linkages coupled with one another. It is advantageous if the four-joint linkages have length-adjustable means. For one thing, adjustment of the four-joint linkages can be undertaken with these length-adjustable means, particularly a re-adjustment in the sense of preventive maintenance or adaptation to the local conditions at the setup surface for the baling press.

It is advantageous if it is provided that the first four-joint linkage is formed by a first lever having a first joint, a second lever having a second joint, and a third lever having a third joint and a fourth joint.

The second four-joint linkage is preferably formed by an end region of the first lever, the third lever, a length-adjustable fourth lever, and a fifth lever, wherein the fifth lever is connected with the holder for the collection container, with a connection crosspiece.

The second four-joint linkage is coupled with the end region of the first lever, with a seventh joint, and the third joint on the first four-joint linkage. The levers of the second four-joint linkage are disposed so as to be in an active connection with one another, and movable relative to one another, by means of the third joint, a fifth joint, a sixth joint, and a seventh joint.

By means of the combination of four-joint linkages, particularly of four-joint linkages coupled with one another, the new lifting/tipping device can be charged both from the rear and from its face side, the bale ejection side, when used on baling presses, preferably having a horizontal construction.

By means of the improved movement behavior of the lifting/tipping device, the pivoting space required for the collection container is further reduced on a baling press, so that—as compared with known solutions—a space having a low construction height is required for operation of the baling press; particularly when bales in a "standard size" are produced with the baling press, and thereby the dimensions of the baling press are essentially predetermined. Experiments have shown that the required spatial height can be significantly less than 3 m.

According to one embodiment variant, the drive of the lifting/tipping device, preferably a hydraulic cylinder, is coupled to a lever arm of the first lever with the end of its piston rod. For example, this lever arm is an angled-away end of the lever.

A further advantageous embodiment of the lifting/tipping device is seen in that the first lever is disposed at least on a base plate with its first joint, and the second lever is disposed at least on the base plate with its second joint provided on its angled-away end, wherein the base plate is preferably attached to a side wall of the baling press, preferably in the region of a second housing module of a housing of the baling press.

According to another aspect of the invention, the means for transforming the force made available by the drive are a chain drive each for the lifting movement and the pivoting movement. Preferably, at least one gear wheel of the gear wheels for driving and/or deflecting and/or transferring the torques is disposed eccentric to the axes of rotation of the levers for lifting and/or for pivoting of the collection container, at least in one of the chain drives, so that in this variant of the invention, as well, the lifting movement of the collection container and the pivoting movement of the collection container are superimposed, at least temporarily, during the movement for emptying the collection container and moving it back into its starting position. Furthermore, in this way different movement speeds in the lifting movement itself and in the pivoting movement itself, as well as in the lifting movement and the pivoting movement relative to one another, become possible.

A further aspect of the invention is the creation of a baling press for compaction of waste material, such as cardboard and similar packaging material, comprising a housing, a pressing body disposed in the housing in horizontally movable manner, a drive unit for the pressing body, a control unit, a collection chamber disposed in front of the pressing body, a pressing chamber that is present after the collection chamber in the pressing direction, a filling shaft disposed above the collection chamber, which shaft is open toward the top and opens downward into the collection chamber, wherein, seen in the pressing direction, the face-side wall of the pressing chamber that lies opposite the pressing body is configured as a door, as well as a lifting/tipping device that has a holder for coupling the collection container on one end, and is connected with a drive at the other end, and is configured for moving the collection container filled with the waste material from its starting position, in which coupling of the collection container with the lifting/tipping device takes place, into an end position for emptying the waste material into the opening of the filling shaft, as the result of the force of gravity, which material gets into the collection chamber connected with the pressing chamber, in front of the pressing body, through the shaft, in which the lifting/tipping device is disposed on the housing of the baling press in such a manner, according to the invention, that a floor space for positioning and coupling the collection container with a holder of the lifting/tipping device coincides with a functional surface in the baling press, which surface is present for ejection of a bale, so that coupling the collection container with the lifting/tipping device takes place, on the face side, in front of the housing of the baling press.

A further aspect of the invention consists in a method for operating, particularly for filling a baling press for compaction of waste material, such as cardboard and similar packaging material, which has a housing, a pressing body disposed in the housing in horizontally movable manner, a drive unit for the pressing body, a control unit, a collection chamber disposed in front of the pressing body, a pressing chamber that is present after the collection chamber in the pressing direction, a filling shaft disposed above the collection chamber, which shaft is open toward the top and opens downward into the collection chamber, wherein, seen in the pressing direction, the face-side wall of the pressing chamber that lies opposite the pressing body is configured as a door, as well as a lifting/tipping device that has a holder for coupling the collection container on one end, and is connected with a drive at the other end, and is configured for moving the collection container filled with the waste material from its starting position, in which coupling of the collection container with the lifting/tipping device takes place, into an end position for emptying the waste material into the opening of the filling shaft, as the result of the force of gravity, which material gets into the collection chamber in front of the pressing body, connected with the pressing chamber, through the shaft, in which, according to the invention, a collection container filled with waste material is positioned and locked in place in the lifting/tipping device,
then the collection container is lifted from its starting position into an end position, for emptying, and back into the starting position, by means of a lifting movement that pivots about a first joint,
and, at least temporarily, the collection container experiences a further pivoting movement during this pivoting/lifting movement, for gradual inclination or tipping of its upper edge with reference to the lifting arm, about a further joint, and righting into its starting position during the return movement,
finally, the emptied collection container is unlocked and removed from the lifting/tipping device.

An embodiment variant of the method is that element parts of the lifting/tipping device, which are positioned in front of the door for coupling and uncoupling of the collection container, are moved, at least immediately before ejection of a finished bale, into a position above the front housing module that contains the pressing chamber or of the center housing module, and temporarily parked there.

BRIEF DESCRIPTION OF THE DRAWINGS

Further details, characteristics, and advantages of the invention will be mentioned in the following description part, and will be explained in greater detail, and are furthermore disclosed in connection with the specification and the exemplary embodiments of the invention shown schematically in the drawings, which show:

FIG. 2a an enlarged view of a section of the representation according to FIG. 2;

FIG. 7 a baling press having a horizontal construction, in a schematic representation, in a side view;

FIG. 8 the baling press according to FIG. 7 in a top view, and

FIG. 9 the baling press according to FIG. 7 in a top view according to FIG. 8, and the functional surfaces required according to the invention;

as well as

FIG. 10 the baling press according to FIG. 7 in a top view according to FIG. 8, as well as the functional surfaces required according to the state of the art.

DETAILED DESCRIPTION OF THE PREFERRED EMBODIMENTS

The reference symbols used in the figures each have the same meaning, even if they are not explicitly mentioned with regard to every figure in the description of the embodiments. Terms such as "left," "right," "at the top" or "at the bottom" are mentioned, in each instance, solely with regard to the representation in the figures; in the actual arrangement in practice, other positions can occur. Furthermore, it is hereby pointed out that the figures are not technical drawings, for which reason cross-hatching and break lines are absent. The relative dimensions can also deviate from reality.

Figure 1:
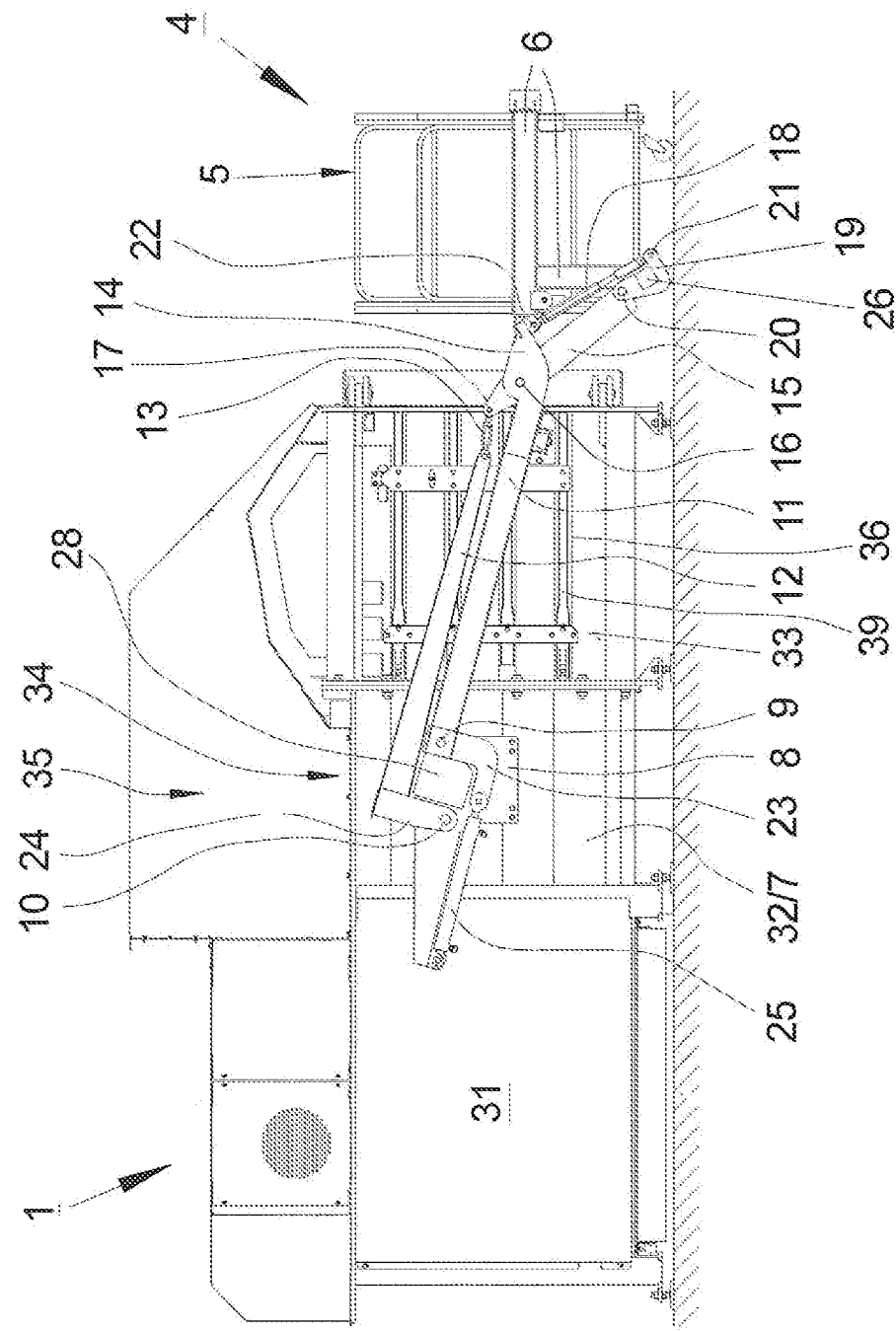
FIG. 1 a baling press having a horizontal construction, having a lifting/tipping device according to the invention, in a side view.

FIG. 1 shows a baling press 1 according to the invention, having a horizontal construction, for compaction of loose waste material, for example of cardboard and similar packaging material, having the new lifting/tipping device 4 according to the invention. The baling press 1, in known manner, comprises at least one housing 30, see also FIGS. 7 to 9, having a rear housing module 31—for accommodating the drive unit—, a center housing module 32, and a front housing module 33, in which the pressing chamber is provided and in which compaction of the loose material into bales takes place.

A filling shaft 35 is disposed above the center housing module 32, which shaft is open toward the top and opens downward into a collection chamber 34 disposed in front of the pressing chamber 33, see also FIGS. 7 to 9.

Figure 2:
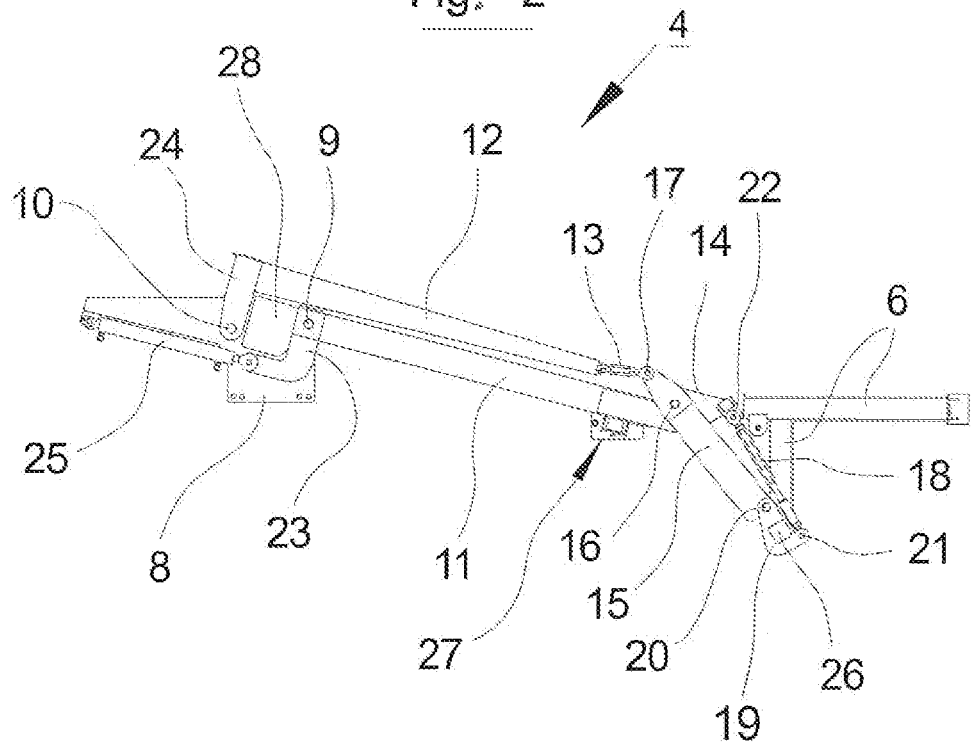
FIG. 2 the lifting/tipping device according to FIG. 1, without the baling press, in a basic position.

A lifting/tipping device 4 according to the invention, see also FIG. 2, for lifting and pivoting as well as additional inclination of a collection container 5 filled with loose waste material is disposed on the baling press 1. The collection container 5 is accommodated in an insertion holder of the holder 6. Here, the collection container 5 is in a basic position, the starting position.

The holder 6 for accommodating the collection container 5 is such that the collection container 5 can be pushed into the holder 6 from the side, in other words from the operating side of the baling press. The holder 6 has a coupling, in the form of a connection part 26, to the lifting/tipping device 4 according to the invention, by means of which coupling the collection container 5 can be lifted, pivoted, and furthermore inclined, from the starting position, its basic position, into an emptying position, in which the waste material falls into the opening of the filling shaft 35 under the force of gravity, and gets through the shaft into the collection chamber 34. Subsequently, compaction of the waste material into a bale takes place by means of a known advancing device having a pressing body 2, see FIG. 7, by means of one or more pressing strokes. After the prescribed bale size has been reached, the door 37, which closes off the exit opening of the pressing chamber for pressing and, at the same time, forms the counter-plate for the pressing process, is opened, and the finished bale can be pushed onto the surface 43 provided on the face side in front of the housing 30, see FIG. 9, in the predetermined advancing direction, the pressing direction 3, see FIG. 7. Before the door 37 is opened, the holder 6, with or without the collection container 5, is lifted into a position above the housing 30, preferably into the end position, so that the door 37 as well as the slits 36 provided in the front housing module 33 are accessible without hindrance.

The holder 6 for accommodating and coupling the collection container 5 to the lifting/tipping device 4 is provided on the baling press 1, according to the invention, on the side of bale ejection, in other words on the face side 58, and not, as in known manner, at the rear 59, as in a baling press according to the state of the art, for example a baling press according to EP 2 537 668 A2.

For coupling and uncoupling the collection container 5 with the lifting/tipping device 4, the insertion holder configured in known manner is present on the holding unit/holder 6. Coupling of the collection container 5 takes place by pushing it into the holding unit 6 and uncoupling takes place by pushing it out.

According to the invention, the lifting/tipping device 4 of the baling press 1 consists of two four-joint linkages coupled with one another. A base plate 8 is disposed on one of the two side walls 7 of the baling press 1, preferably in the region of the center module 32. A first joint 9 for a first lever 11 and a second joint 10 for a second lever 12 are disposed on the base plate 8. The joints have the functions, among other things, of a pivot bearing.

The first lever 11 has an angled-away end 23 after the connection location with the first joint 9. The second lever 12 has an angled-away end 24. This angled-away end 24 is connected with the second joint 10.

A length-adjustable equalization element 13 is disposed on the end of the second lever 12 that lies opposite the angled-away end 24 of the same. A third lever 15 is articulated onto the equalization element 13, at the end of the equalization element 13 and in the end region 14 of the first lever 11, by means of a third joint 16 and an opposite fourth joint 17 on the first lever 11. The levers 11, 12, 15 with the joints 9, 10, 16, 17 thereby form a first four-joint linkage.

A coupled second four-joint linkage is formed by the end region 14 of the first lever 11, the third lever 15, a length-adjustable fourth lever 18, as well as a fifth lever 19, wherein a connection part 26 for the connection with the holder 6 is disposed on the fifth lever 19.

The length-adjustable equalization element 13 and the length-adjustable fourth lever 18 serve at least for equalizing tolerances in the lever system of the lifting/tipping device 4. The fourth lever 18 also has the function of a pulling arm.

The third lever 15 is articulated onto the fifth lever 19 by means of a fifth joint 20, and the length-adjustable lever 18 is articulated onto the fifth lever 19 by means of a sixth joint 21. The fourth lever 18 is articulated onto the end region 14 of the first lever 11 with a seventh joint 22.

The piston rod of the hydraulic cylinder 25 is coupled onto the angled-away end 23 of the first lever 11. By means of activation of the hydraulic cylinder 25, the lifting/tipping unit 4 moves, and the collection container 5 is lifted, pivoted, and, at the same time, inclined until it reaches its upper end position, the emptying position. With this inclination or tipping, the position of the upper edge of the collection container 5, which edge faces the baling press, is changed with reference to the lifting arm 11 or the first lever and the second lever 12. This upper edge inclines toward the lifting arm 11 during the "lifting" movement. In the reverse movement, in other words the movement of the collection container back into its starting position, the inclination that has been achieved is cancelled out again.

In the end position, the collection container 5 is tipped in such a manner that the loose waste material—the material to be pressed—falls downward into the collection chamber 34 through the open filling shaft 35, under the force of gravity. This sequence, along with other details, is shown in FIGS. 3 to 6.

A significant advantage of the lifting/tipping device 4 according to the invention consists in that lifting of the collection container 5 in accordance with FIGS. 3 to 6 takes place in space-saving manner, particularly with regard to the required spatial height.

In FIGS. 3 to 6, the baling press 1 and the lifting/tipping device 4 shown in FIGS. 1 and 2 are shown in simplified manner, for greater clarity.

Figure 3:
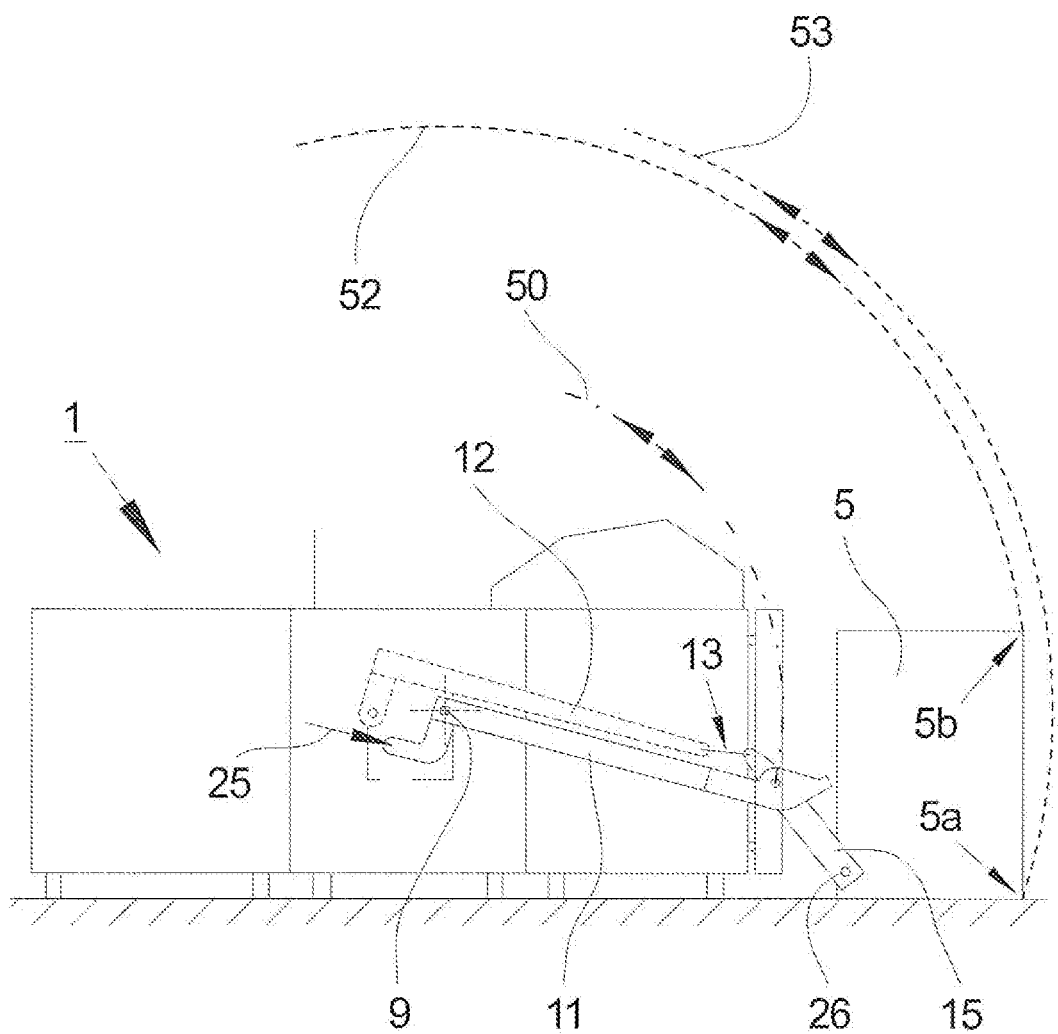
FIG. 3 the lifting/tipping device along with the baling press according to FIG. 1, in a schematic representation and in the basic position.

In FIG. 3, the arcs 52 and 53 show how the outer edges 5a, 5b of the collection container 5 move during a lifting movement for emptying the collection container 5 and filling the filling shaft 35 or the collection chamber 34, if the lifting/tipping device were structured according to the state of the art, such as, for example, in a baling press having a lifting/tipping device according to EP 2 537 668 A2. In such a lifting/tipping device according to the state of the art, the second lever 12 is not present, and therefore this lever is shown with a broken line in FIG. 3. The arc 50 approximately describes the line that is traveled by a free end section of the lifting arm during the "lifting" movement.

Figure 4:
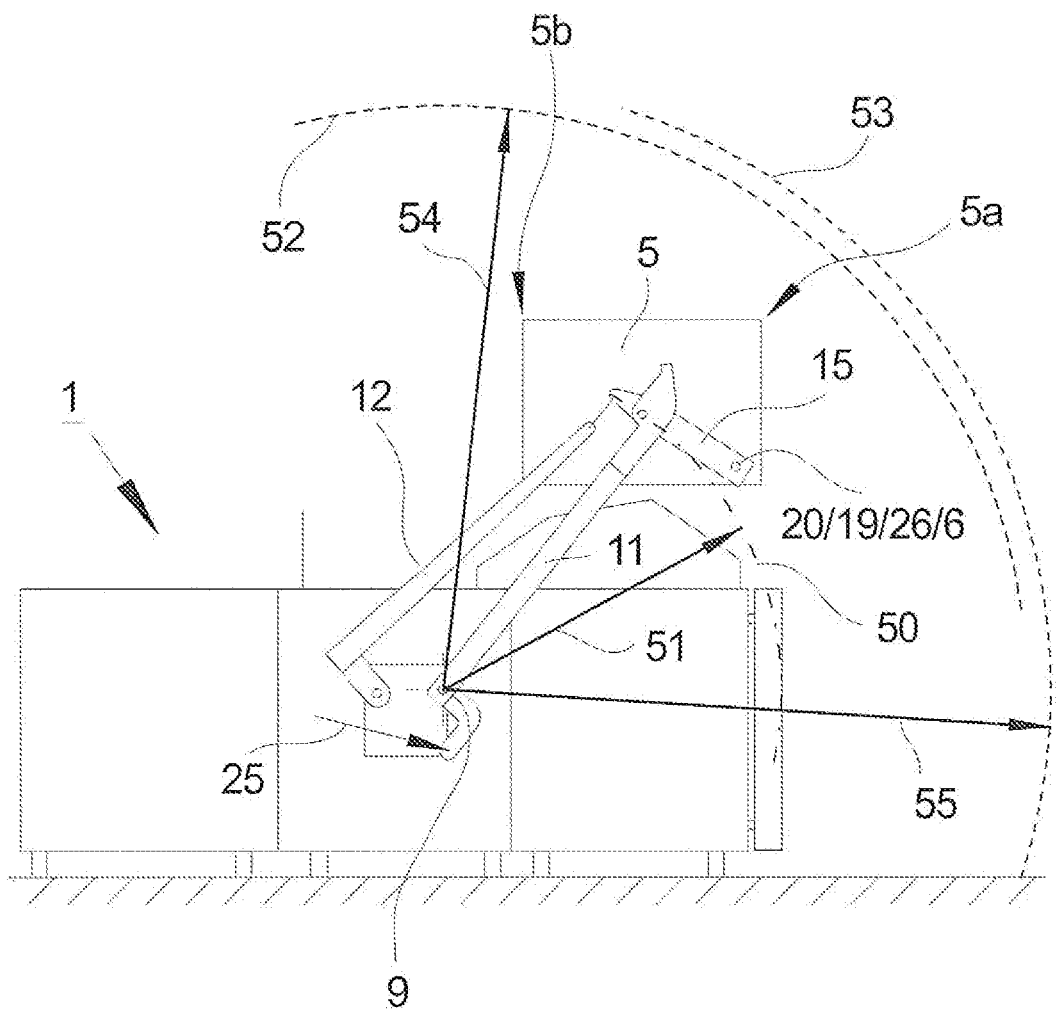
FIG. 4 the lifting/tipping device according to FIG. 3 in an upper position.

The radii 51, 54, and 55 that belong to the first arc 50, the second arc 52, and the third arc 53 are shown in FIG. 4.

In FIG. 4, the collection container 5 that has been lifted and, at the same time, at least partially tipped according to the method according to the invention is shown in an intermediate position between the starting position and the end position. It is clearly evident that the outer body edges 5a, 5b of the collection container 5 require a significantly lower spatial height than in the case of pivoting using devices according to the state of the art.

Figure 5:
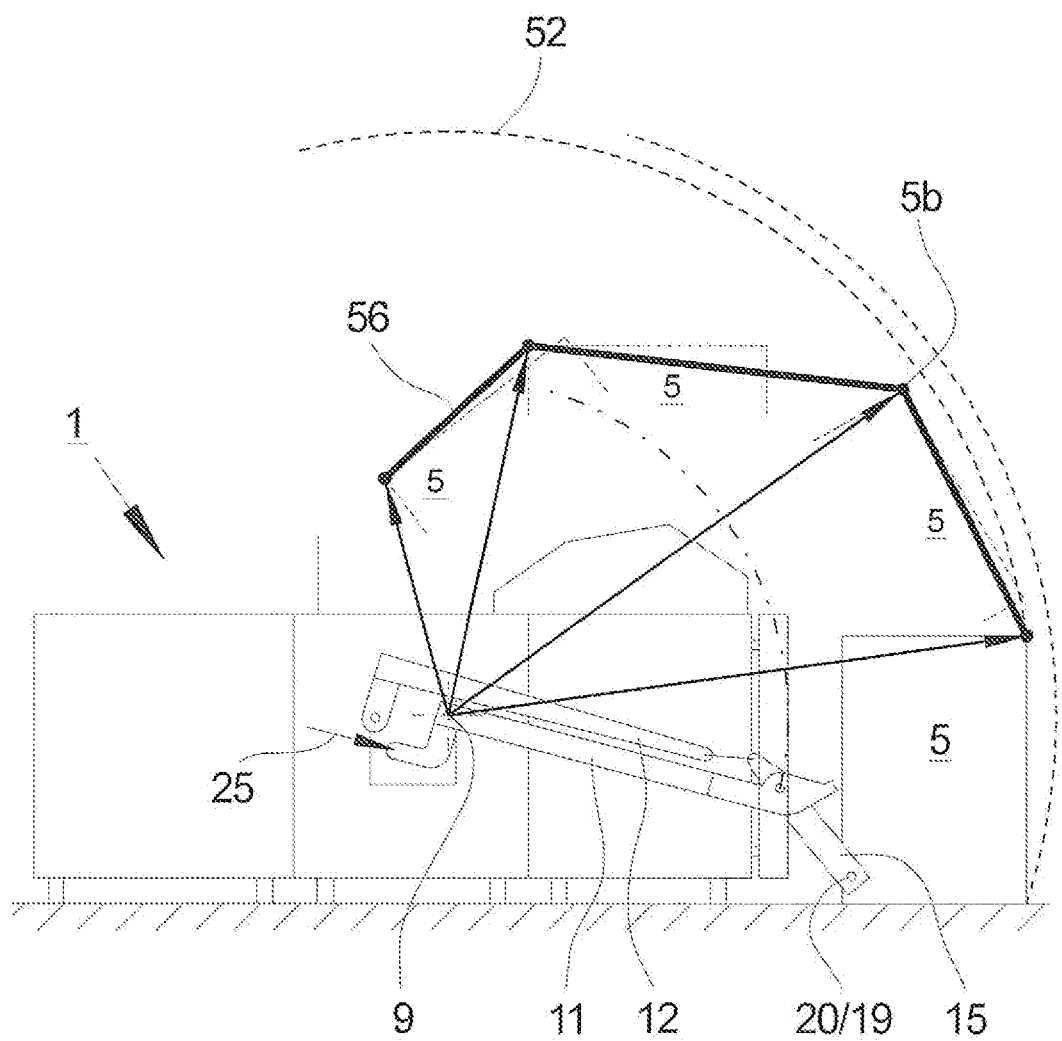
FIG. 5.

In FIG. 5, the collection container 5 coupled to the lifting/tipping device 4 is first shown in its starting position. The movement line 56—seen in terms of height—shows the spatial movement of the upper outer edge 5b of the collection container 5 in different lifting and pivoting positions, all the way to the final position, the emptying position. On the basis of the representation, it is evident that the movement line of the outer upper edge of the collection container requires a significantly lower spatial height. In the representation shown here, the movement line 56 is a polygon course on the basis of the four position points used here; in fact, the movement line 56 is a curved path that is not an arc.

Figure 6:
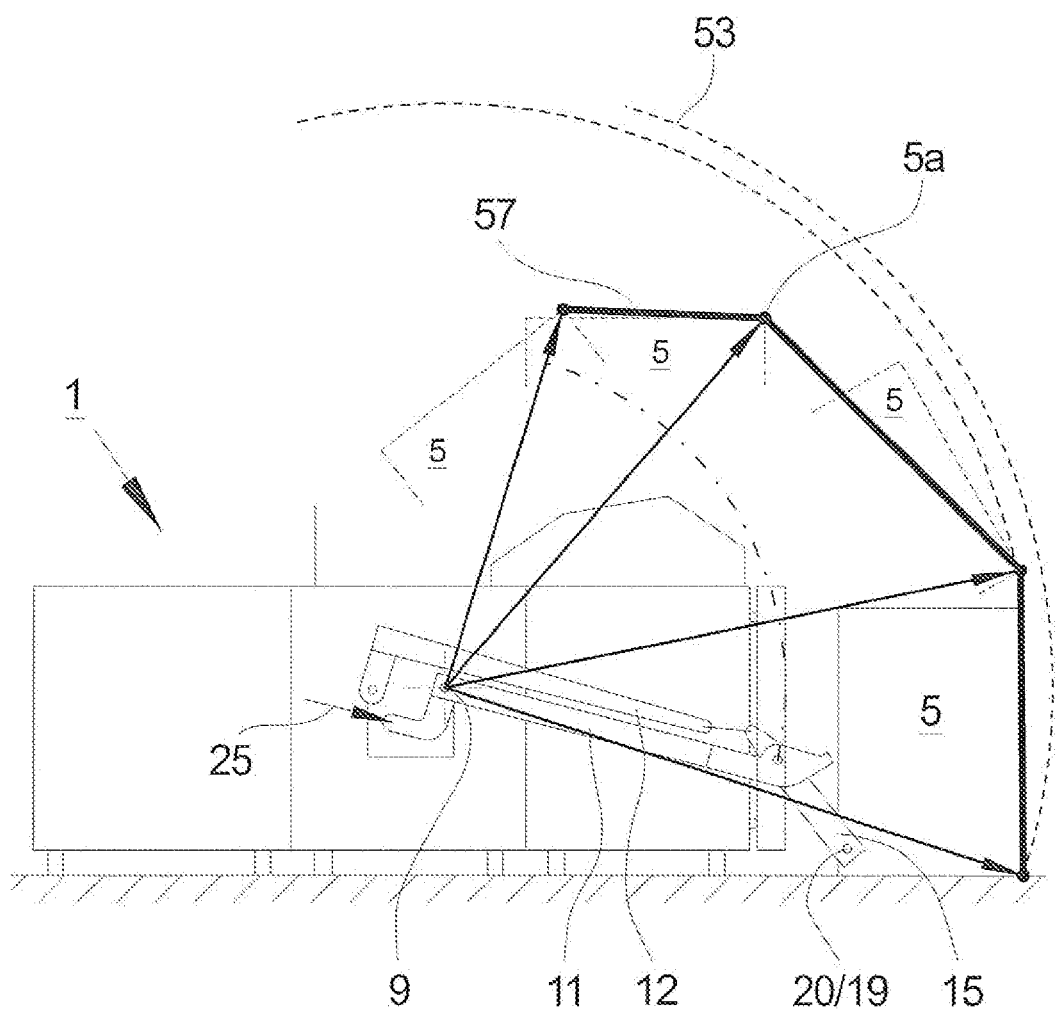
FIG. 6 representations of different positions of the collection container during its lifting movement and its pivoting movement.

The representation in FIG. 6 shows the same thing as FIG. 5, only with reference to the lower, outer edge 5a of the collection container 5 during its movement from the starting position into the end position. The movement line traveled by this lower outer edge 5a has the reference symbol 57. Here, too, it holds true that in the case of the actual movement, the movement line 57 is a curved path; this path, too, is not an arc.

FIGS. 7, 8, and 9 show the baling press 1 according to the invention according to FIG. 1, in highly schematic representation, set up in a work chamber 60. The work chamber possesses a bottom surface 61. To state it in better terms, the baling press 1 can be set up very close to a side wall 62 by using the invention.

In FIG. 7, the baling press is shown in a (partially) perspective representation; the door 37 is closed, so that the pressing chamber 33 is a pressing compartment here. For greater clarity, the representation of the lifting/tipping device 4 was eliminated here and in FIGS. 8 and 9. The functional height that is required for operation of the baling press and the related lifting/tipping device 4 in a work chamber 60 is indicated with the reference symbol 48.

FIG. 8 shows a top view of the representation according to FIG. 7. The door 37 is open, so that a finished bale can be pushed out. The surface area that is required for setup of the baling press 1 is indicated with the dot-dash line 40; this is the setup surface 40.

In FIG. 9, the baling press 1 according to the invention is shown according to the representation according to FIG. 8. Furthermore, in this representation, the functional surfaces and walking surfaces for the operator, required directly next to the baling press 1 for operation of the baling press 1, are shown schematically with different types of lines. On the face side 58 of the baling press 1, in other words in front of the front housing module 33, a surface 43 for bale ejection is provided. To the side of this, a transport surface 44 is required for removal of a bale 49. In front of the operating side of the bale press 1, a walking surface 41 for the operator is required. The path for removal of a bale 9 is indicated with the reference symbol 46. The transport path 63 for bringing a filled collection container 5 to the holder 6 of the lifting/tipping device 4 also lies on the transport surface 44.

In the baling press 1 according to the invention, when the door 37 is closed, the surface 43 for bale ejection is simultaneously used as a floor space for the collection container 25, for coupling it to the holder 6. The floor space 42—according to the state of the art—has therefore been displaced from the rear side 59 to the face side 58, directly in front of the front housing module 33. Thereby now only one surface is needed for bale ejection and for the basic position of the collection container 5 next to the baling press 1. The surface 43 and the floor space 42 therefore coincide in the same surface, thereby making it possible to reduce the total functional surface next to the baling press 1 that is required.

Because of the configuration of the baling press 1 and/or of the new lifting/tipping device 4 used in the baling press, according to the invention, no functional surfaces are required in the region of the rear side 59 of the baling press 1. With the present lifting/tipping device 4 according to the invention, the possibility is furthermore created of using such baling presses even in spaces having a relatively low ceiling height. To clarify these advantages of the invention, a baling press having the same horizontal construction is shown schematically in FIG. 10, for a comparison with the baling press 1 according to the invention shown in FIG. 9. Furthermore, the further, additional functional surfaces and functional paths, which are necessary if a lifting/tipping device according to the state of the art were used, are also shown in FIG. 10.

A second transport path for bringing in a collection container 5 is marked with the reference symbol 45. The surface in which the collection container 5 is in a starting position, when it is moved using a lifting/tipping device from the state of the art, for example a lifting/tipping device according to EP 2 537 668 A2, is indicated with the floor space 42.

A first transport path for bringing in a collection container 5 is marked with the reference symbol 47. The surface in which the collection container 5 is in a starting position, when it is moved using a lifting/tipping device from the state of the art, is indicated with the floor space 42. In this variant, a lifting/tipping device was used that is even older than the lifting/tipping device according to EP 2 537 668 A2. In this example from the state of the art, the required floor space 42 is even greater.

In a baling press 1 having the lifting/tipping device 4 according to the invention, known control mechanisms that are not shown in any greater detail are also provided, for example in the form of a distance measurement device or testing means that evaluate the distance between the collection container 5 and the insertion holder when the collection container 5 is pushed into the insertion holder 6.

In the figures, the drive device 64 that usually belongs to a baling press, for moving the pressing body and possible further movable components or modules of the baling press, as well as the control unit 65, were not shown or shown only in very simplified form.

The invention is not restricted to the exemplary embodiment. All the characteristics disclosed in the description as well as in the drawings are further integral parts of the invention.

Thus, the speed of the lifting movement and/or the speed of the pivoting movement of parts and modules of the lifting/tipping device as such and in partial segments of the movement from the starting position into the end position (emptying position) and back into the starting position can be different in terms of amount and variable relative to one another, for which purpose individual parts or modules of the lifting/tipping device can be different, in terms of shape and dimension, than shown in the exemplary embodiment according to FIGS. 1 to 9 and explained in the description.

Such an adaptation of the lifting/tipping device according to the invention can also be necessary if the conditions at the site of setup and use of the baling press do not allow an embodiment of the invention according to the figures and according to the description. These conditions can be, for one thing, the existing height of the space at the setup location, as well as the ceiling shape and the available surface areas next to the baling press. Such an adaptation in terms of shape and dimension does not necessarily mean a departure from the core idea of the invention.

REFERENCE SYMBOL LIST 1 baling press
2 pressing body (pressing plate)
3 pressing direction
4 lifting/tipping device
5 collection container
5a lower outer body edge
5b upper outer body edge
5c upper front body edge (facing the baling press)
6 holder for collection container (holding unit)
7 side wall
8 base plate
9 first joint
second joint
11 first lever (lifting arm)
12 second lever (pulling arm)
13 length-adjustable equalization element
14 front end region of the first lever 11
third lever (lifting and pivoting arm)
16 third joint
17 fourth joint
18 length-adjustable fourth lever (pulling arm)
19 fifth lever (pivoting arm)
20 fifth joint
21 sixth joint
22 seventh joint
23 angled-away end of the first lever 11
24 angled-away end of the second lever 12
hydraulic cylinder
26 connection part
27 rest/support
28 connection crosspiece
30 housing
31 rear housing module (with drive unit)
32 center housing module
33 front housing module (pressing chamber, pressing box)
34 ante-chamber (collection chamber)
35 filling shaft
36 slits (in Item 33)
37 door (face surface of the pressing chamber, counter-plate)
38 hinges
39 guide plates
40 setup surface (for Item 1)
41 walking surface (for the operator)
42 floor space for the collection container (according to the state of the art)
43 surface for bale ejection
44 transport surface (for the bale)
45 second transport path according to the state of the art, for bringing in a collection container
46 path for removal of the bale
47 first transport path according to the state of the art, for bringing in a collection container
48 functional height in the chamber
49 bale
50 first arc
51 radius of the first arc
52 second arc
53 third arc
54 radius of the second arc
55 radius of the third arc
56 movement line (of the upper outer edge 5b of Item 5)
57 movement line (of the lower outer edge 5a of Item 5)
58 face side (of Item 1)
59 rear side (of Item 1)
60 work chamber
61 bottom surface
62 side wall
63 transport path according to the invention, for bringing in a collection container
64 drive unit (4 Item 2)
65 control unit

The invention claimed is:

1. Lifting/tipping device for emptying a collection container into a baling press, for compaction of waste material, wherein the baling press has at least one housing, a pressing body disposed in the housing in horizontally movable manner, a drive unit for the pressing body, a control unit, a collection chamber disposed in front of the pressing body, a pressing chamber that is present after the collection chamber in a pressing direction, a filling shaft disposed above the collection chamber, which shaft is open toward the top and opens downward into the collection chamber, wherein, seen in the pressing direction, a face-side wall of the pressing chamber that lies opposite the pressing body is configured as a door, wherein the lifting/tipping device has a holder for coupling the collection container on one end, and is connected with a drive at the other end, and is configured for a movement, the movement comprising moving the collection container filled with the waste material from its starting position, in which coupling of the collection container with the lifting/tipping device takes place, into an end position for emptying the waste material into the opening of the filling shaft, as the result of the force of gravity, which material gets into the collection chamber connected with the pressing chamber, in front of the pressing body, through the shaft, wherein the lifting/tipping device further comprises a transformer configured to transform the force made available by the drive into a lifting and pivoting movement of the collection container, the transformer being disposed in such a manner that a second pivoting movement of the collection container is superimposed, at least temporarily, on a lifting movement of the collection container that pivots about a first joint of the lifting/tipping device during the movement for emptying the collection container and moving it back into its starting position, and wherein the transformer is disposed in such a manner that the speed of the lifting movement and the speed of the second pivoting movement are different from one another.

2. Lifting/tipping device according to claim 1, wherein the transformer is disposed in such a manner that the lifting movement and/or the second pivoting movement is/are not uniform between the starting position and the end position of the moved collection container.

3. Lifting/tipping device according to claim 1, wherein the lifting/tipping device essentially consists of two four-joint linkages that are coupled with one another and interact functionally, along with the drive.

4. Lifting/tipping device according to claim 3, wherein the first four-joint linkage is formed by a first lever having a first joint, a second lever having a second joint, and a third lever having a third joint and a fourth joint.

5. Lifting/tipping device according to claim 4, wherein the drive of the lifting/tipping device is a hydraulic cylinder, the hydraulic cylinder having a piston rod coupled to a lever arm of the first lever in the vicinity of the first joint.

6. Lifting/tipping device according to claim 4, wherein the first lever is disposed at least on a base plate with its first joint, and the second lever is disposed at least on the base plate with its second joint provided on its angled away end.

7. Lifting/tipping device according to claim 1, wherein the transformer is disposed in such a manner that outer body edges of the collection container or of the holder, with reference to the lifting movement and the second pivoting movement, during the movement from the starting position into the end position, for emptying the collection container and returning it to its starting position, move along a movement line that is smaller, in terms of amount, in each instance, than the related arc that results from a radius between the first joint and the respective body edge.

8. Lifting/tipping device according to claim 7, wherein the movement line of the body edges is a curved path, in each instance.

9. Lifting/tipping device according to claim 1, wherein the lifting/tipping device is disposed on the housing of the baling press in such a manner that a floor space for positioning and coupling the collection container with a holder of the lifting/tipping device coincides with a functional surface in the baling press, which surface is present for ejection of a bale, so that coupling the collection container with the lifting/tipping device takes place, on the face side, in front of the housing of the baling press.

10. Lifting/tipping device according to claim 6, wherein the base plate is attached to a side wall of the baling press.

11. Lifting/tipping device according to claim 10, wherein the base plate is attached to the side wall of the baling press in a region of a second housing module of the housing of the baling press.

12. Lifting/tipping device according to claim 8, wherein each curved path has different radii between its beginning and end.

13. Method for using a lifting/tipping device for emptying a collection container into a baling press with waste material for compaction of the waste material, wherein the baling press has at least one housing, a pressing body disposed in the housing in horizontally movable manner, a drive unit for the pressing body, a control unit, a collection chamber disposed in front of the pressing body, a pressing chamber that is present after the collection chamber in a pressing direction, a filling shaft disposed above the collection chamber, which shaft is open toward the top and opens downward into the collection chamber, wherein, seen in the pressing direction, a face-side wall of the pressing chamber that lies opposite the pressing body is configured as a door, wherein the lifting/tipping device has a holder for coupling the collection container on one end, and is connected with a drive at the other end, and is configured for a movement, the movement comprising moving the collection container filled with the waste material from its starting position, in which coupling of the collection container with the lifting/tipping device takes place, into an end position for emptying the waste material into the opening of the filling shaft, as the result of the force of gravity, which material gets into the collection chamber connected with the pressing chamber, in front of the pressing body, through the shaft, wherein the lifting/tipping device further comprises a transformer configured to transform the force made available by the drive into a lifting and pivoting movement of the collection container, the transformer being disposed in such a manner that a second pivoting movement of the collection container is superimposed, at least temporarily, on a lifting movement of the collection container that pivots about a first joint of the lifting/tipping device during the movement for emptying the collection container and moving it back into its starting position, the method comprising the collection container filled with waste material is positioned and locked in place in the lifting/tipping device, then the collection container is lifted from its starting position into an end position, for emptying, and back into the starting position, via the lifting movement that pivots about the first joint of the lifting/tipping device, at least temporarily, the collection container experiences the second pivoting movement during this pivoting/lifting movement, for gradual inclination/tipping of its upper edge about a further joint, and righting into its starting position during the return movement, finally, the emptied collection container is unlocked and removed from the lifting/tipping device, and element parts of the lifting/tipping device, which are positioned in front of the door for coupling and uncoupling the collection container, are moved, at least immediately before ejection of a finished bale, into a position above a front housing module that contains the pressing chamber or of a center housing module, and temporarily parked there.

14. Lifting/tipping device for emptying a collection container into a baling press, for compaction of waste material, wherein the baling press has at least one housing, a pressing body disposed in the housing in horizontally movable manner, a drive unit for the pressing body, a control unit, a collection chamber disposed in front of the pressing body, a pressing chamber that is present after the collection chamber in a pressing direction, a filling shaft disposed above the collection chamber, which shaft is open toward the top and opens downward into the collection chamber, wherein, seen in the pressing direction, a face-side wall of the pressing chamber that lies opposite the pressing body is configured as a door, wherein the lifting/tipping device has a holder for coupling the collection container on one end, and is connected with a drive at the other end, and is configured for a movement, the movement comprising moving the collection container filled with the waste material from its starting position, in which coupling of the collection container with the lifting/tipping device takes place, into an end position for emptying the waste material into the opening of the filling shaft, as the result of the force of gravity, which material gets into the collection chamber connected with the pressing chamber, in front of the pressing body, through the shaft, wherein the lifting/tipping device further comprises a transformer configured to transform the force made available by the drive into a lifting and pivoting movement of the collection container, the transformer being disposed in such a manner that a second pivoting movement of the collection container is superimposed, at least temporarily, on a lifting movement of the collection container that pivots about a first joint of the lifting/tipping device during the movement for emptying the collection container and moving it back into its starting position, wherein the lifting/tipping device essentially consists of two four-joint linkages that are coupled with one another and interact functionally, along with the drive, wherein the first four-joint linkage is formed by a first lever having a first joint, a second lever having a second joint, and a third lever having a third joint and a fourth joint, wherein the second four-joint linkage is formed by an end region of the first lever with the third joint and a seventh joint, the third lever with a fifth joint, a length-adjustable fourth lever articulated onto the seventh joint and a sixth joint, and a fifth lever that is articulated onto the fifth joint at one end and onto the sixth joint at the other end, and wherein the fifth lever is connected with the holder for the collection container via a connection part.

15. Lifting/tipping device for emptying a collection container into a baling press, for compaction of waste material, wherein the baling press has at least one housing, a pressing body disposed in the housing in horizontally movable manner, a drive unit for the pressing body, a control unit, a collection chamber disposed in front of the pressing body, a pressing chamber that is present after the collection chamber in a pressing direction, a filling shaft disposed above the collection chamber, which shaft is open toward the top and opens downward into the collection chamber, wherein, seen in the pressing direction, a face-side wall of the pressing chamber that lies opposite the pressing body is configured as a door, wherein the lifting/tipping device has a holder for coupling the collection container on one end, and is connected with a drive at the other end, and is configured for a movement, the movement comprising moving the collection container filled with the waste material from its starting position, in which coupling of the collection container with the lifting/tipping device takes place, into an end position for emptying the waste material into the opening of the filling shaft, as the result of the force of gravity, which material gets into the collection chamber connected with the pressing chamber, in front of the pressing body, through the shaft, wherein the lifting/tipping device further comprises a transformer configured to transform the force made available by the drive into a lifting and pivoting movement of the collection container, the transformer being disposed in such a manner that a second pivoting movement of the collection container is superimposed, at least temporarily, on a lifting movement of the collection container that pivots about a first joint of the lifting/tipping device during the movement for emptying the collection container and moving it back into its starting position, wherein the lifting/tipping device essentially consists of two four-joint linkages that are coupled with one another and interact functionally, along with the drive, wherein the first four-joint linkage is formed by a first lever having a first joint, a second lever having a second joint, and a third lever having a third joint and a fourth joint, and wherein the four-joint linkages that are coupled with one another have a length-adjuster for variable adjustment of the active length of at least one of the levers of the four-joint linkages.

16. Lifting/tipping device for emptying a collection container into a baling press, for compaction of waste material, wherein the baling press has at least one housing, a pressing body disposed in the housing in horizontally movable manner, a drive unit for the pressing body, a control unit, a collection chamber disposed in front of the pressing body, a pressing chamber that is present after the collection chamber in a pressing direction, a filling shaft disposed above the collection chamber, which shaft is open toward the top and opens downward into the collection chamber, wherein, seen in the pressing direction, a face-side wall of the pressing chamber that lies opposite the pressing body is configured as a door, wherein the lifting/tipping device has a holder for coupling the collection container on one end, and is connected with a drive at the other end, and is configured for a movement, the movement comprising moving the collection container filled with the waste material from its starting position, in which coupling of the collection container with the lifting/tipping device takes place, into an end position for emptying the waste material into the opening of the filling shaft, as the result of the force of gravity, which material gets into the collection chamber connected with the pressing chamber, in front of the pressing body, through the shaft, wherein the lifting/tipping device further comprises a transformer configured to transform the force made available by the drive into a lifting and pivoting movement of the collection container, the transformer being disposed in such a manner that a second pivoting movement of the collection container is superimposed, at least temporarily, on a lifting movement of the collection container that pivots about a first joint of the lifting/tipping device during the movement for emptying the collection container and moving it back into its starting position, and wherein the transformer comprises a chain drive each for the lifting movement and the pivoting movement and gear wheels for driving and/or deflecting and/or transferring torques, wherein the lifting/tipping device further comprises levers for lifting and for second pivoting of the collection container, wherein at least in one of the chain drives, at least one of the gear wheels is disposed eccentric to axes of rotation of the levers, and wherein the lifting movement of the collection container and the second pivoting movement of the collection container are superimposed, at least temporarily, during the movement for emptying the collection container and moving it back into its starting position.

* * * * *